(12) United States Patent
Koreeda et al.

(10) Patent No.: US 8,721,190 B2
(45) Date of Patent: May 13, 2014

(54) OPTOELECTRICAL CONNECTOR

(75) Inventors: Yuichi Koreeda, Tokyo (JP); Osamu Hashiguchi, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 58 days.

(21) Appl. No.: 13/076,429

(22) Filed: Mar. 31, 2011

(65) Prior Publication Data

US 2011/0243508 A1  Oct. 6, 2011

(30) Foreign Application Priority Data

Apr. 2, 2010  (JP) .................................. 2010-086109

(51) Int. Cl.
*H01R 33/945* (2006.01)
*H04B 10/00* (2013.01)
*G02B 6/36* (2006.01)

(52) U.S. Cl.
USPC .................. 385/78; 385/25; 385/26; 385/76; 385/77; 385/88; 385/89; 385/92; 385/100; 385/101; 385/139; 398/134; 398/135; 398/136; 398/137; 398/138; 398/139; 439/577

(58) Field of Classification Search
USPC ........................... 385/88–89, 76–78, 92, 139; 398/134–139; 439/577
See application file for complete search history.

(56) References Cited

U.S. PATENT DOCUMENTS

| | | | |
|---|---|---|---|
| 3,790,791 A * | 2/1974 | Anderson | 250/227.24 |
| 4,325,606 A | 4/1982 | Ikuno et al. | |
| 4,427,879 A * | 1/1984 | Becher et al. | 250/215 |
| 5,212,751 A * | 5/1993 | Brownjohn | 385/75 |
| 5,280,552 A * | 1/1994 | Yokoi et al. | 385/78 |
| 5,337,388 A * | 8/1994 | Jacobowitz et al. | 385/76 |
| 6,454,462 B2 * | 9/2002 | Nguyen et al. | 385/53 |
| 6,485,192 B1 * | 11/2002 | Plotts et al. | 385/75 |
| 6,588,938 B1 * | 7/2003 | Lampert et al. | 385/58 |
| 6,802,654 B1 * | 10/2004 | Roberts et al. | 385/88 |
| 6,843,606 B2 * | 1/2005 | Deane et al. | 385/92 |

(Continued)

FOREIGN PATENT DOCUMENTS

| | | |
|---|---|---|
| JP | 55-078932 | 6/1980 |
| JP | 60-039009 A | 2/1985 |

(Continued)

OTHER PUBLICATIONS

First office action for corresponding Chinese patent application No. 201110077750.5 issued Feb. 18, 2013.

(Continued)

*Primary Examiner* — Ryan Lepisto
*Assistant Examiner* — Guy Anderson
(74) *Attorney, Agent, or Firm* — Greenblum & Bernstein, P.L.C.

(57) ABSTRACT

An optoelectrical connector is composed of a plug to which a wire and an optical fiber are assembled and a receptacle to which the plug is inserted and connected. A receptacle includes insulation sleeves and conductive contacts in openings of receptacle housings, and plugs include a ferrule assembled bodies which are composed of an insulation ferrule which holds an optical fiber and a conductive cylindrical member which holds the ferrule and to which a wire is assembled, in an opening of the plug housing. When the plugs are inserted into the receptacle, the contacts and the cylindrical member contact with each other and the ferrules are inserted into the sleeves. Parts which serve electrical connection are not exposed.

5 Claims, 14 Drawing Sheets

(56) References Cited

U.S. PATENT DOCUMENTS

| | | | |
|---|---|---|---|
| 7,558,460 B2* | 7/2009 | Yamaguchi et al. | 385/139 |
| 2003/0180012 A1* | 9/2003 | Deane et al. | 385/92 |
| 2004/0218873 A1* | 11/2004 | Nagashima et al. | 385/75 |
| 2004/0258363 A1* | 12/2004 | Shigihara et al. | 385/73 |
| 2006/0093277 A1* | 5/2006 | Mulligan | 385/75 |
| 2009/0269013 A1* | 10/2009 | Durand et al. | 385/77 |
| 2011/0058774 A1* | 3/2011 | Gurreri et al. | 385/78 |
| 2011/0243508 A1* | 10/2011 | Koreeda et al. | 385/78 |
| 2011/0293223 A1* | 12/2011 | Shimazu et al. | 385/81 |

FOREIGN PATENT DOCUMENTS

| | | |
|---|---|---|
| JP | 06-342116 | 12/1994 |
| JP | 08-211256 | 8/1996 |
| JP | 2002-182070 | 6/2002 |
| JP | 2003-262762 | 9/2003 |
| JP | 3488873 B2 | 1/2004 |
| JP | 2005-071940 | 3/2005 |
| JP | 2005-316281 A | 11/2005 |
| JP | 2007-193251 | 2/2007 |
| JP | 2007-241105 | 9/2007 |
| JP | 2009-086562 A | 4/2009 |

OTHER PUBLICATIONS

First office action issued May 13, 2013 for corresponding Canadian patent application No. 2,735,339.
China Office action, dated Jan. 8, 2014 along with an english translation thereof.
Japan Office action, dated Nov. 5, 2013 along with an english translation thereof.

* cited by examiner

OPTOELECTRICAL CONNECTOR

TECHNICAL FIELD

The present invention relates to an optoelectrical connector that is composed of a plug to which an electrical wire and an optical fiber are assembled and a receptacle to which the plug is inserted and connected.

BACKGROUND ART

Japanese Patent Application Laid Open No. 2002-182070 (published on Jun. 26, 2002, and referred to below as Patent literature 1) discloses an optoelectrical connector that is used at a terminal of a photoelectric transmission medium and has an optical connector shape. FIGS. 1 and 2 respectively illustrate the configuration of a receptacle and the configuration of a plug that are described in Patent literature 1. As shown in FIG. 1, a receptacle 700 includes conductive wire springs 710 at an end part thereof. As shown in FIG. 2, a plug 800 includes metallic blades 810 corresponding to the wire springs 710 of the receptacle 700, at a lower surface thereof. Electrical connection is performed when the wire springs 710 and the metallic blades 810 elastically contact with each other. A ferrule 820 disposed at the central part of the plug 800 is inserted into an alignment sleeve 720 of the receptacle 700 and aligned so as to perform optical connection. FIG. 2 is an exploded view of the plug 800. In FIG. 2, a reference numeral 1 denotes a cable, a reference numeral 2 denote conductors, and a reference numeral 3 denotes a fiber. Further, reference numerals 830 and 840 respectively denote housings, a reference numeral 850 denotes a heat shrinkable tube, and a reference numeral 860 denotes a bend-limiting device.

On the other hand, Japanese Patent Application Laid Open No. 2005-071940 (published on Mar. 17, 2005, and referred to below as Patent literature 2) discloses an optoelectrical connector having an electric connector shape. FIG. 3 illustrates the configuration described in Patent literature 2. Patent literature 2 describes that conductive ferrules 920-1 and 920-2 which are respectively covered by nonconductive shells 910-1 and 910-2 are brought into contact with each other with a nonconductive connection member (sleeve) 930, as the first configuration. Further, as the second configuration, Patent literature 2 describes that nonconductive ferrules 920-1 and 920-2 which are respectively covered by conductive shells 910-1 and 910-2 are brought into contact with each other with a conductive connection member 930. Accordingly, an optical connection is performed by optical fibers 5 and 6 which are respectively held inside the ferrules 920-1 and 920-2, and electrical connection is performed by the conductive ferrules 920-1 and 920-2 or by the conductive shells 910-1 and 910-2 through the conductive connection member 930. Here, in FIG. 3, reference numerals 7 and 8 denote coaxial cables and reference numerals 940 and 950 denote connector bodies. Further, reference numerals 960 and 970 denote caps and a reference numeral 980 denotes a nut.

SUMMARY OF THE INVENTION

In the configuration disclosed in Patent literature 1, parts which serve electrical connection (the wire springs 710 of the receptacle 700 and the metallic blades 810 of the plug 800) are exposed, so that a person can directly touch the parts and may get an electrical shock disadvantageously. Further, since the parts which serve electrical connection are exposed, a hand or foreign materials may contact to the parts and therefore scurf, foreign materials, and the like are attached to the parts to cause performance degradation, short-circuiting, and malfunctions.

In the configuration disclosed in Patent literature 2, the conductive ferrules 920-1 and 920-2 or the conductive shells 910-1 and 910-2 are parts that serve electrical connection. Thus, an exposed amount of the parts which serve the electrical connection is reduced compared to Patent literature 1. However, the problem is not fundamentally solved and the configuration of Patent literature 2 still has a similar problem to that of Patent literature 1. Further, if the ferrules 920-1 and 920-2 are formed to be conductive or the connection member (sleeve) 930 is formed to be conductive, that is, they are made from metal such as gold, they become abraded through use and processing accuracy is degraded. This abrasion and degradation of processing accuracy cause displacement of central positions of the two optical fibers 5 and 6 that perform optical connection, causing performance degradation and the like.

An optoelectrical connector according to the present invention includes a plug to which a wire and an optical fiber are assembled and a receptacle to which the plug is inserted and connected in order to address these problems. In the optoelectrical connector, the receptacle includes an insulation sleeve and conductive contacts in an opening of a receptacle housing thereof, and the plug includes a ferrule assembled body that is composed of an insulation ferrule that holds the optical fiber and a conductive cylindrical member that holds the insulation ferrule and to which the wire is assembled, in an opening of a plug housing thereof. When the plug is inserted into the receptacle, the conductive contacts and the conductive cylindrical member contact with each other and the insulation ferrule is inserted into the insulation sleeve.

Effects of the Invention

The present invention has such structure that the conductive contacts are provided in the opening of the receptacle housing, the conductive cylindrical member to which the wire is assembled is provided in the opening of the plug housing, and the contacts and the cylindrical member contact with each other when the plug is inserted into the receptacle, so that parts serving electrical connection are not exposed. Therefore, electrical shock caused by exposition of the parts serving the electrical connection can be prevented and further, short-circuiting, malfunction, and the like caused by attachment of a foreign material and the like can be prevented advantageously. Further, the ferrule and the sleeve are insulators, so that when a ceramic member such as zirconia, for example, is used as a constituent element, abrasion accompanied by use can be prevented and high processing accuracy can be maintained.

DETAILED DESCRIPTION OF THE EMBODIMENTS

Embodiments of the present invention will be described below with reference to the accompanying drawings.

<Optoelectrical Connector 300>

An optoelectrical connector 300 according to an embodiment is described. The optoelectrical connector 300 includes a receptacle 100 and plugs 200-1 and 200-2, and connects wires and optical fibers of photoelectric composite cables 10-1A and 10-1B with wires and optical fibers of other photoelectric composite cables 10-2A and 10-2B respectively.

Figure 1:
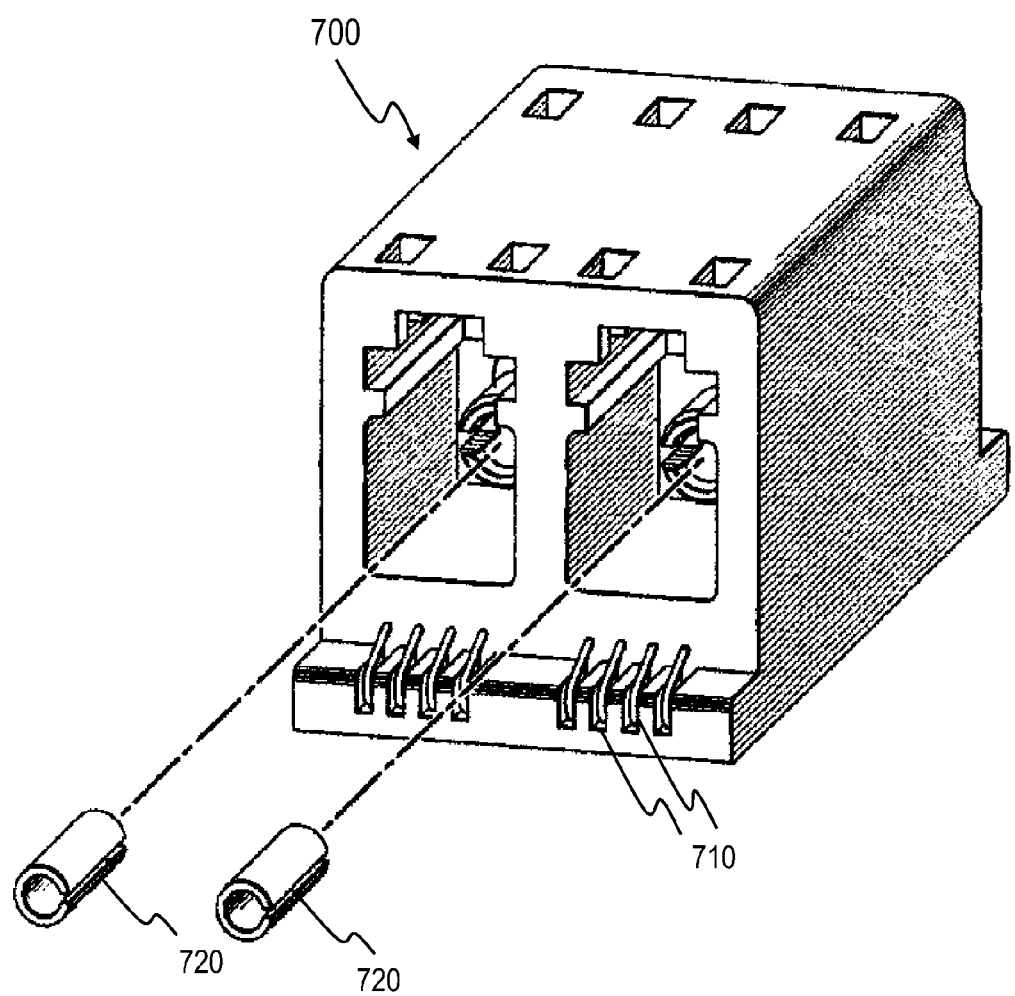
FIG. 1 is a perspective view showing the configuration of a receptacle of an example of an optoelectrical connector according to the related art.
Figure 2:
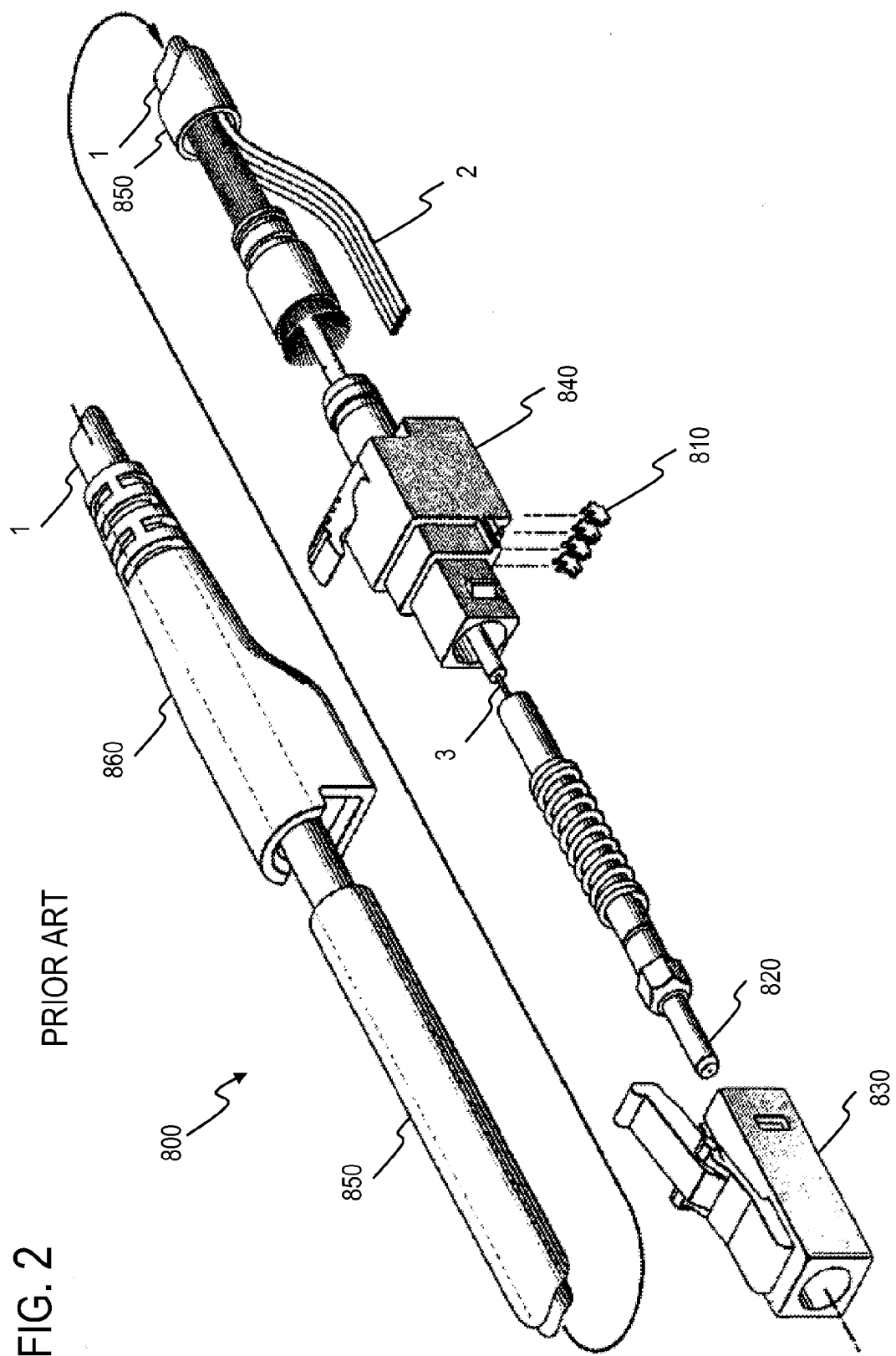
FIG. 2 is an exploded perspective view showing the configuration of a plug of the example of the optoelectrical connector according to the related art.
Figure 3:
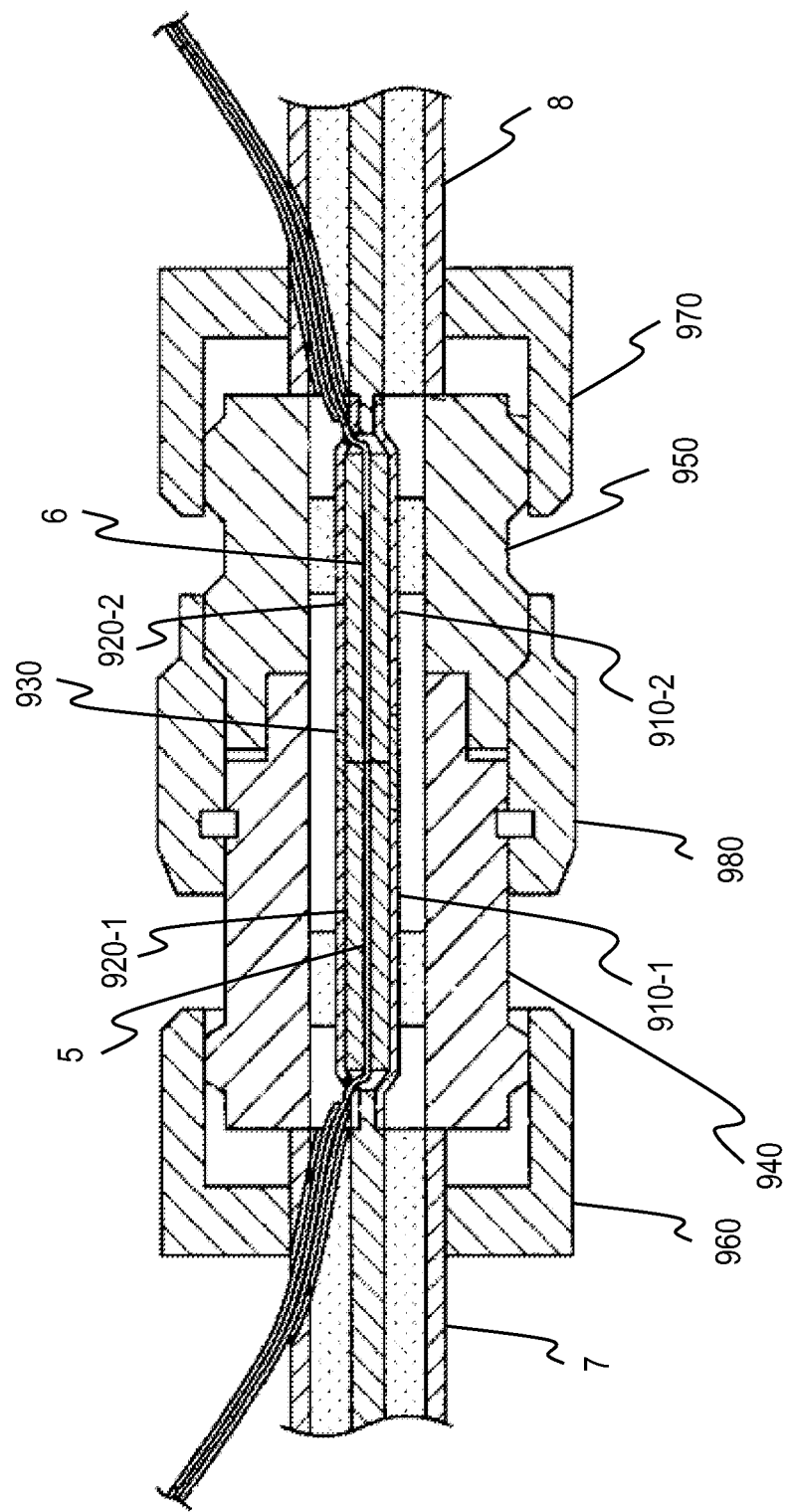
FIG. 3 is a sectional view showing another example of an optoelectrical connector according to the related art.
Figure 4:
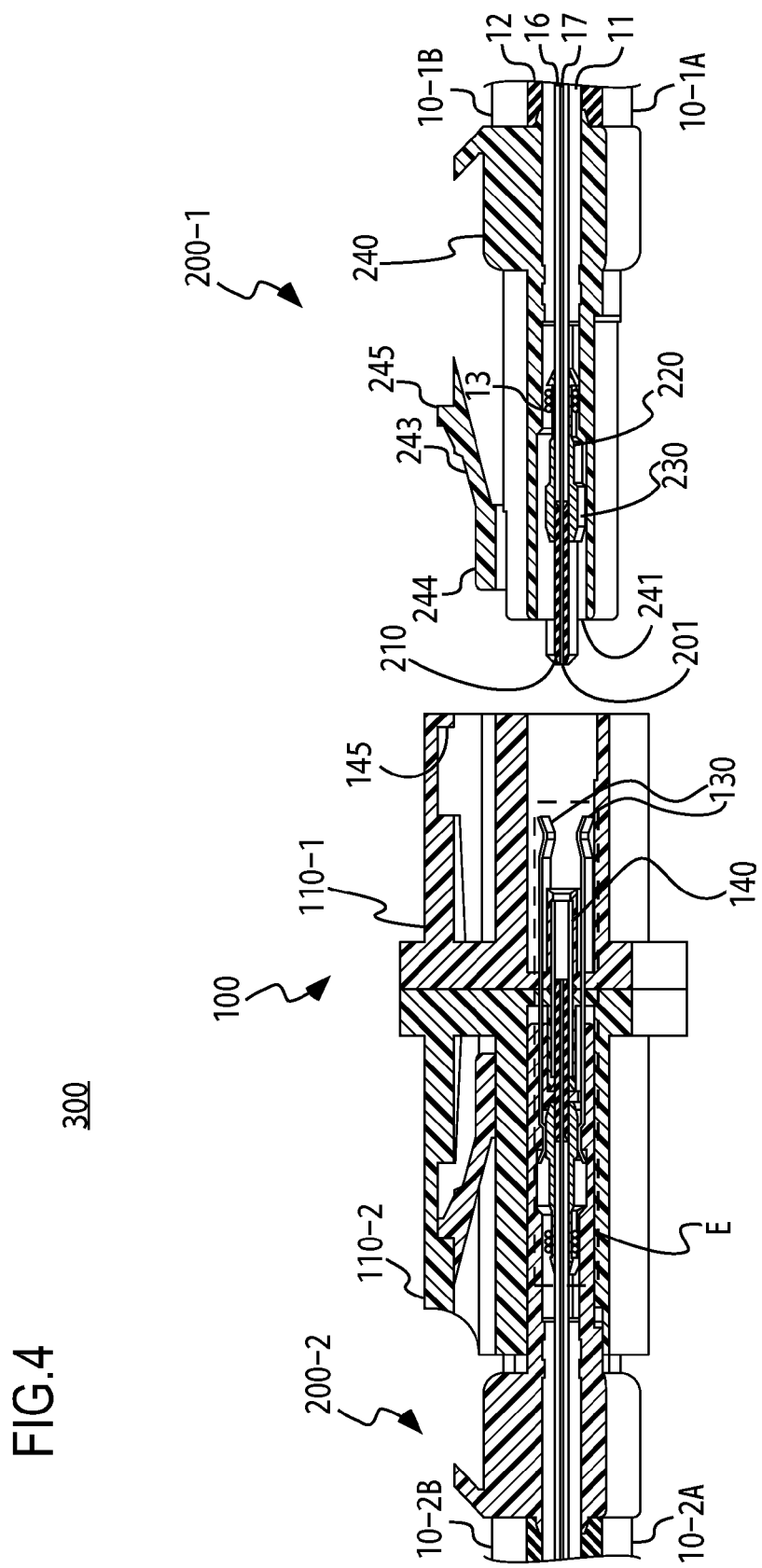
FIG. 4 is a sectional view showing the configuration of an optoelectrical connector before an insertion of a plug, according to an embodiment of the present invention.
Figure 5:
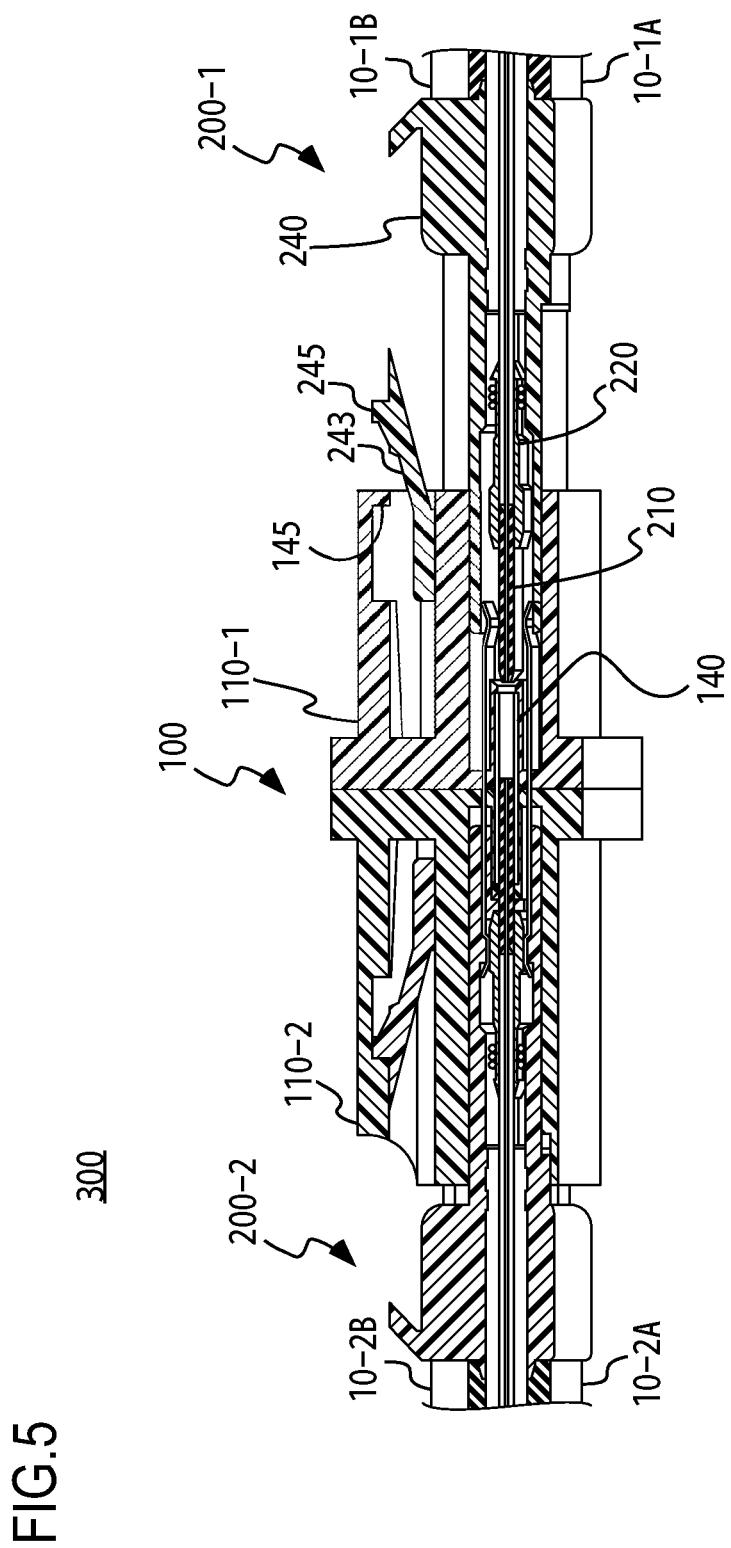
FIG. 5 is a sectional view showing the configuration of the optoelectrical connector during the insertion of the plug, according to the embodiment of the present invention.
Figure 6:
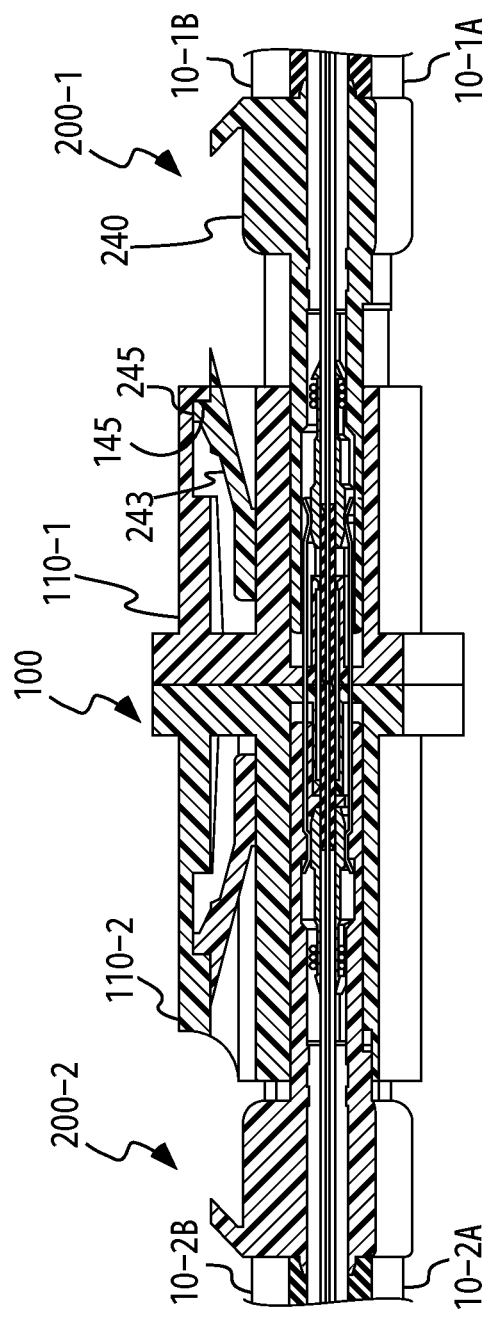
FIG. 6 is a sectional view showing the configuration of the optoelectrical connector after the insertion of the plug, according to the embodiment of the present invention.
Figure 11:
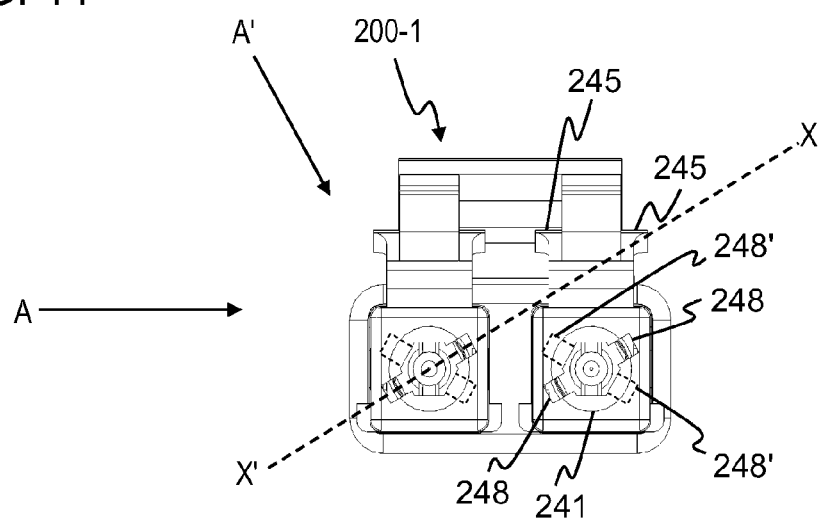
FIG. 11 is an enlarged front view of the plug shown in FIG. 10.
Figure 12:
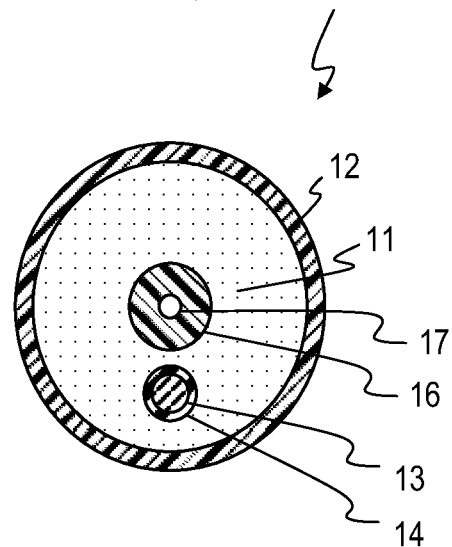
FIG. 12 is an enlarged sectional view of a photoelectric composite cable which is connected to the plug shown in FIG. 10.
Figure 13:
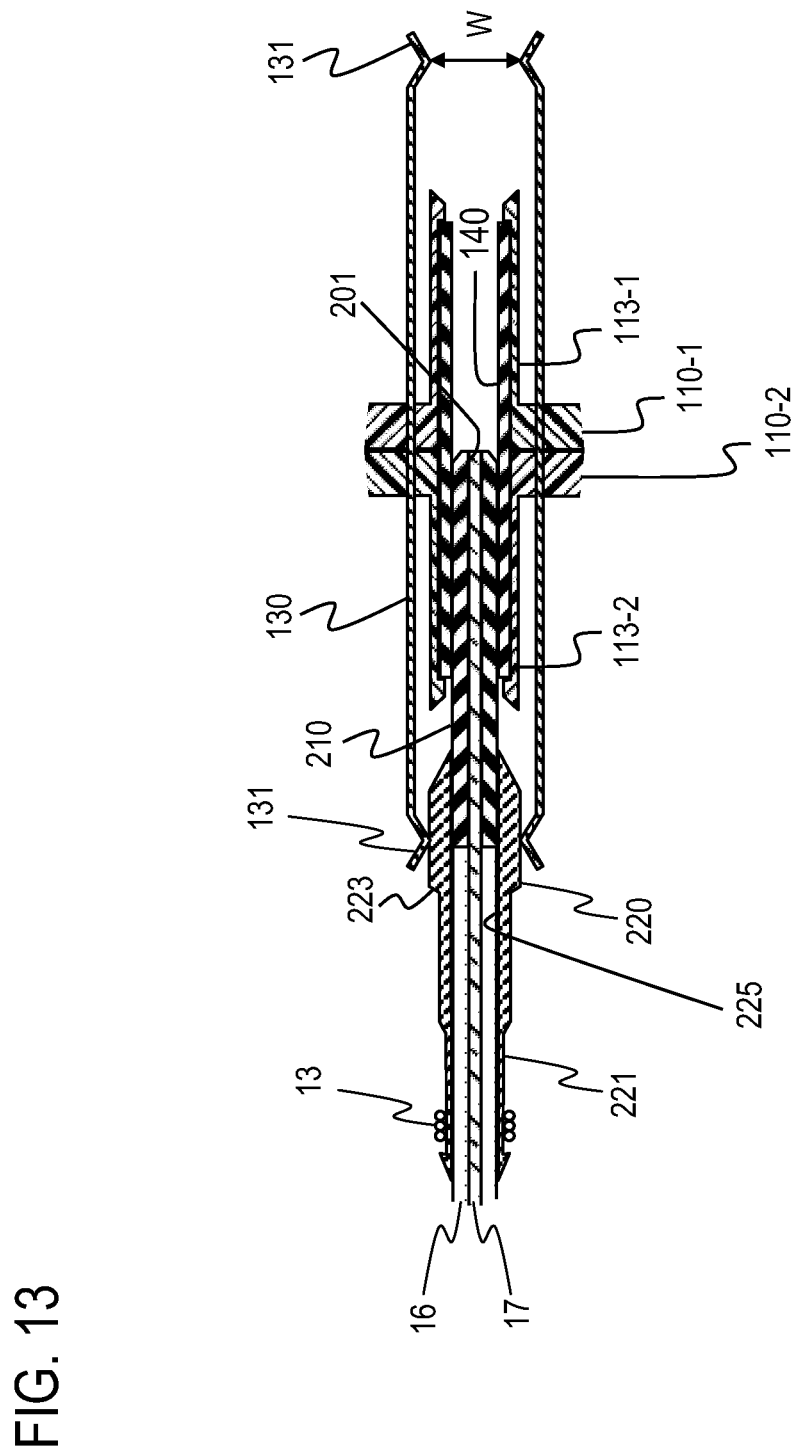
FIG. 13 illustrates the main configuration of the optoelectrical connector according to the embodiment of the present invention.

FIGS. 4 to 6 are sectional views of the optoelectrical connector 300. The configuration of the receptacle 100 is first described with reference to FIGS. 4, 7 to 9, and 13, and the configuration of the plug 200-1 is described with reference to FIGS. 4, 10, 11, and 13. FIGS. 4 to 6 illustrate an axial-direction section which is taken along an X-X' line of FIGS. 8 and 11 and viewed from a direction of an arrow A shown in FIGS. 7, 8, 10, and 11. FIG. 12 is a sectional view of the photoelectric composite cable 10 (10-1A, 10-1B, 10-2A and 10-2B), and FIG. 13 is an enlarged view that shows an area surrounded by a dashed line E of FIG. 4 and is viewed from a direction of an arrow A' shown in FIGS. 8 and 11.

Referring to FIGS. 4 to 6, the photoelectric composite cables 10-1A and 10-1B are connected to the plug 200-1, and other photoelectric composite cables 10-2A and 10-2B are connected to the plug 200-2. The plug 200-2 has the same configuration as that of the plug 200-1 which is described below.

<Plug 200-1>

Figure 10:
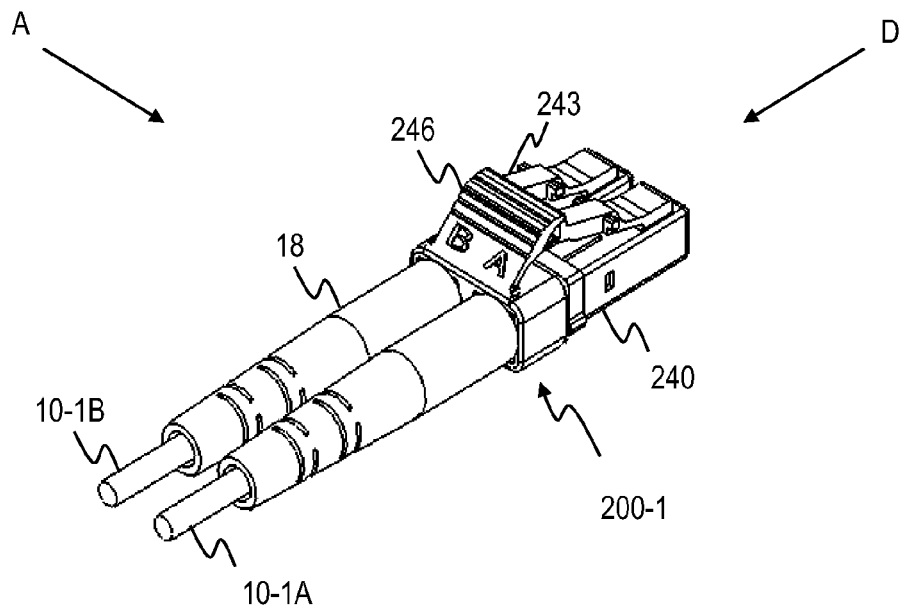
FIG. 10 is a perspective view of the plug of FIG. 4.
Figure 14:
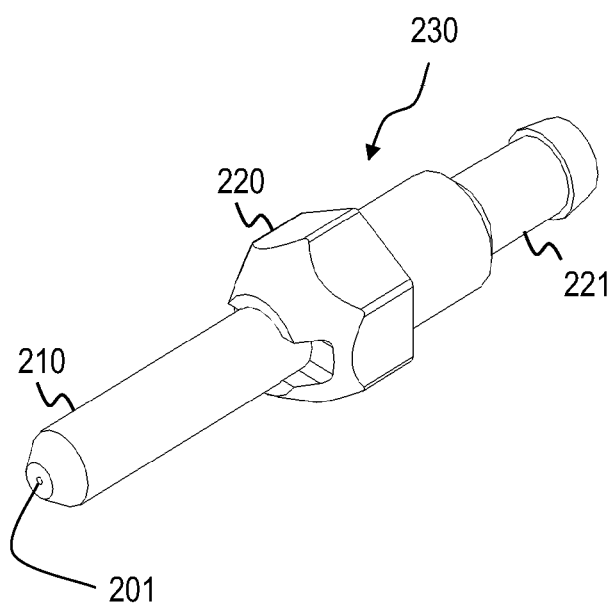
FIG. 14 is a perspective view of a ferrule assembled body of FIG. 13.

The plug 200-1 includes a ferrule assembled body 230 that includes an insulation ferrule 210 which is made of a ceramic member such as zirconia and a conductive cylindrical member 220 which holds the ferrule 210 and to which a wire is assembled. FIG. 10 is a perspective view of the plug 200-1, FIG. 11 is a front view of the plug 200-1 viewed from a direction of an arrow D of FIG. 10, and FIG. 14 is a perspective view of the ferrule assembled body 230. In this embodiment, the two photoelectric composite cables 10-1A and 10-1B are connected to the plug 200-1 so as to perform interactive optical signal transmission and interactive electric signal transmission, as shown in FIG. 10. Therefore, the plug 200-1 includes two pieces of the ferrule assembled bodies 230. The ferrule assembled body 230 connected to one of the photoelectric composite cables 10-1A and 10-1B transmits a photoelectric signal and the ferrule assembled body 230 connected to the rest of the photoelectric composite cables 10-1A and 10-1B receives a photoelectric signal.

The cylindrical member 220 may be made of conductive metal such as copper or may be formed by plating plastic or the like with conductive metal (copper plating, gold plating, or the like).

The plug 200-1 further includes a plug housing 240 which is made of insulator such as plastic. The plug housing 240 has a shape (the outer shape of the plug 200-1) having identical dimensions to the IEC 61754-20 standard, for example. In a space of a front opening part 241 of the plug housing 240, the ferrule assembled body 230 which is composed of the ferrule 210 and the cylindrical member 220 is housed (refer to FIG. 4). As shown in FIG. 11, in the front opening part 241, two insertion grooves 248 for contacts 130 of the receptacle 100 which will be described later are formed to be arranged on a diagonal line (corner portions) of a quadrangle of the IEC61754-20 standard.

An axial path 201 running through the inside of the ferrule 210 has a size enough to accept an end part of the optical fiber 17 (refer to FIGS. 4 and 13). The optical fiber 17 of the photoelectric composite cable 10 is fixed and held in the inside of the axial path 201 of the ferrule 210 by an adhesive and the ferrule 210 is held at a front end part of the cylindrical member 220. Further, a high-polymer material layer 16 covering the optical fiber 17 is held at a rear end part of the cylindrical member 220.

A conductor 13 of the wire is wound around an assembling part 221 of the cylindrical member 220.

The photoelectric composite cable 10 is assembled to the plug 200-1 in a similar manner to the related art (for example, Patent literature 1). An outline is described below. The assembling part 221 of the cylindrical member 220 and the conductor 13 which is wound around the assembling part 221 are surrounded by a plastic tube which is not shown and the plastic tube is surrounded by a coiled spring or the like which is not shown. On end of the spring is pressed to a flange 223 provided on the cylindrical member 220 and the other end is pressed to a stopper inside the plug housing 240. Accordingly, the cylindrical member 220 is energized frontward and the front end of the ferrule 210 is pushed out from the front opening part 241 of the plug housing 240.

The plug housing 240 includes a trigger piece 246 on an upper surface thereof and the trigger piece 246 is structured to interact with latch pieces 243 (refer to FIG. 10). The trigger piece 246 has a fixed end which is disposed in a backward direction of the plug housing 240 and a free end which extends in a frontward direction of the plug housing 240. The free end of the trigger piece 246 is abutted to be placed on free ends of the latch pieces 243. When the trigger piece 246 is pressed, the free ends of the latch pieces 243 are sunk down. The trigger piece 246 facilitates an operation of the latch pieces 243 as well as keeps to prevent the latch pieces 243 from tangling with other cables when the plug 200-1 is pulled backward to be out from bundle of cables, for example.

In assembling the plug 200-1, a bend-limiting device 18 and the like are attached to the photoelectric composite cable 10 to which an outer jacket 12 is attached. Then, parts of various cable constituent elements are removed by an appropriate length. These constituent elements are specifically the outer jacket 12, an insulation layer 14, the high-polymer element layer 16, a protection coating on the optical fiber 17, and a fibrous reinforcement member 11 (refer to FIG. 12). Next, an adhesive is injected into the axial path 201 of the ferrule 210 and a bore 225 of the cylindrical member 220 by an injector or the like. The photoelectric composite cable 10 is inserted into the plug 200-1, the optical fiber 17 is placed inside the axial path 201 of the ferrule 210, and the ferrule 210 and the high-polymer element layer 16 are placed inside the bore 225 of the cylindrical member 220.

<Receptacle 100>

Figure 7:
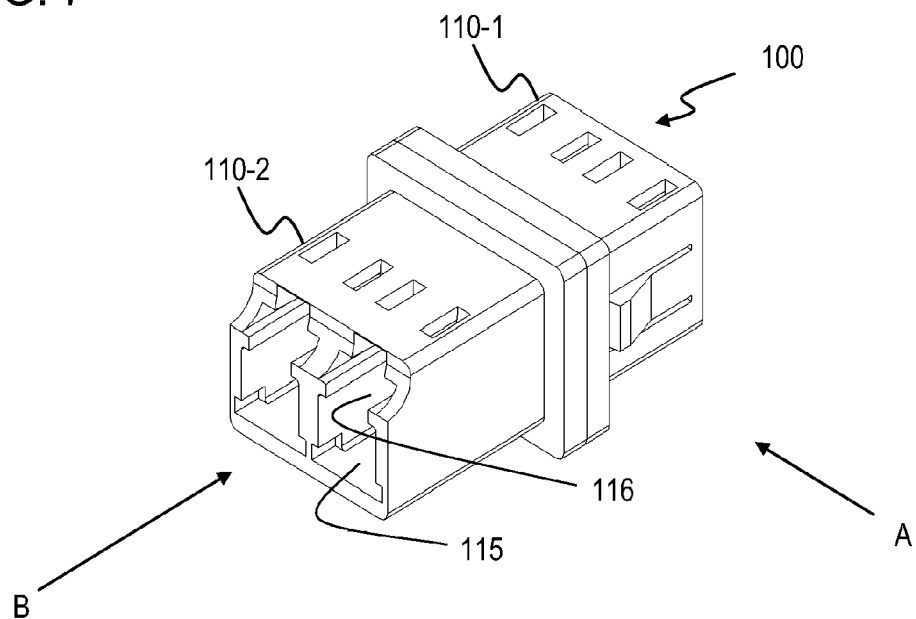
FIG. 7 is a perspective view of a receptacle of FIG. 4.
Figure 8:
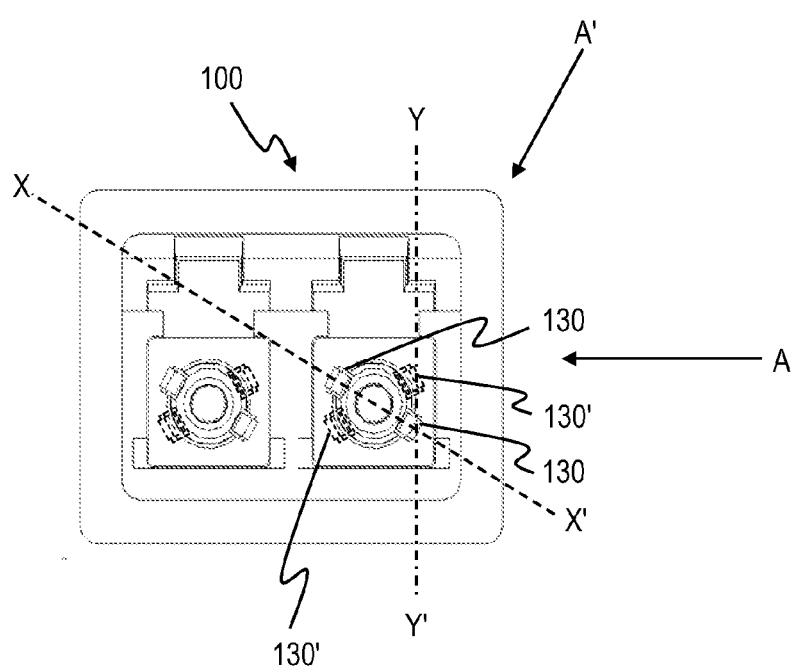
FIG. 8 is an enlarged front view of the receptacle shown in FIG. 7.
Figure 9:
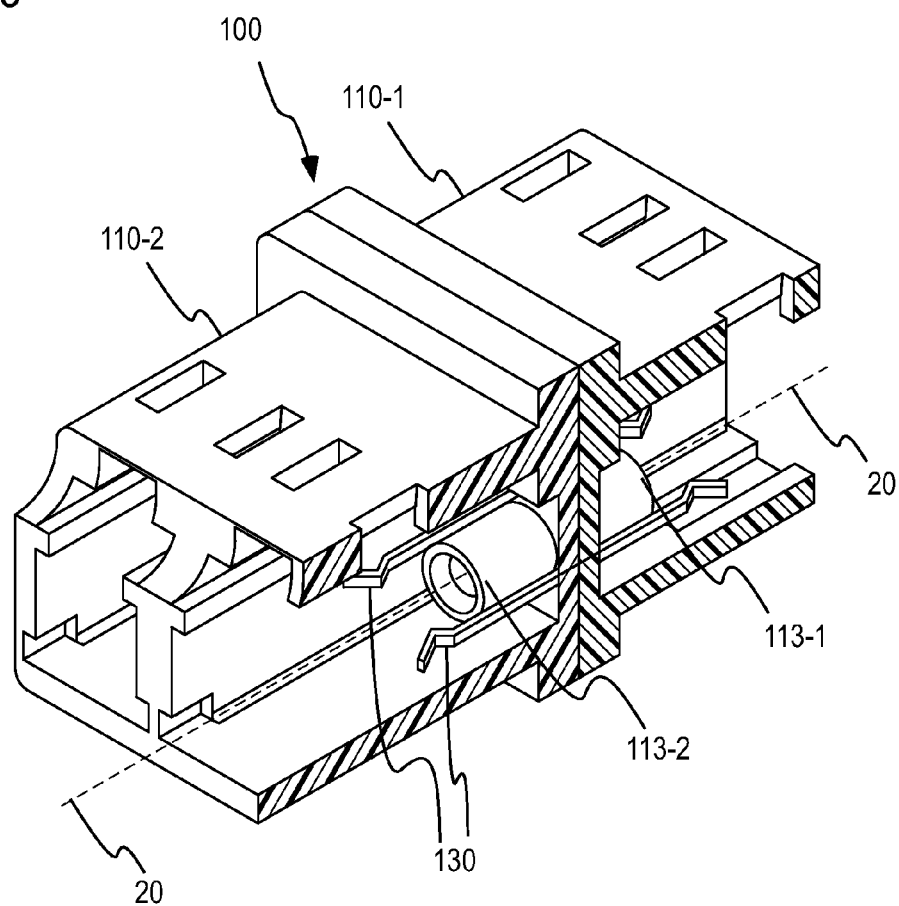
FIG. 9 is an enlarged sectional perspective view of the receptacle shown in FIG. 4.

Insulation sleeves 140 and conductive contacts 130 are built in the receptacle 100. FIG. 7 is a perspective view of the receptacle 100, and FIG. 8 is a front view of the receptacle 100 which is viewed from a direction of an arrow B shown in FIG. 7. FIG. 9 is a perspective view showing a section, which is taken along a Y-Y' line of FIG. 8, of the receptacle 100.

The receptacle 100 which is composed of a first receptacle housing 110-1 and a second receptacle housing 110-2 has an outer shape having identical dimensions to the IEC61754-20 standard. The receptacle 100 has such a structure that the receptacle housings 110-1 and 110-2 cover the sleeves 140 and the contacts 130 and thus the sleeves 140 and the contacts 130 are built in (refer to FIG. 4).

(Sleeve 140)

The sleeve 140 is composed of an insulator which is made of a ceramic member such as zirconia. Thus, the sleeve 140 and the ferrule 210 described above are made of the ceramic member such as zirconia. Therefore, high processing accuracy can be obtained and maintained. Further, the ceramic member such as zirconia has resistance to abrasion, thereby being able to prevent abrasion accompanied by use or the like.

(Contact 130)

The contact 130 is made of conductive metal such as copper and gold. Alternatively, the contact 130 can be formed by plating plastic or the like with conductive metal (copper plating, gold plating, or the like).

As shown in FIG. 9, the central part, in the longitudinal direction, of the contacts 130 is held at the central part of the receptacle 100. Thus, the contacts 130 are cantilevered so as to protrude to the inside of the first receptacle housing 110-1 and the inside of the second receptacle housing 110-2. Two pieces of the contacts 130 are arranged on a diagonal line (corner portions) of a quadrangle of the IEC61754-20 standard as shown in FIG. 8. Thus, the contacts 130 are arranged at the corner portions and therefore the contacts 130 can have sufficient sizes. Accordingly, the contacts 130 can be easily manufactured and large current-capacitance can be acquired.

In spaces inside the first receptacle housing 110-1 and the second receptacle housing 110-2, the plug 200-1 and the plug 200-2 are respectively housed. As shown in FIG. 7, the second receptacle housing 110-2 has commonly-rectangular gates (openings) 115 for housing the plug 200-2. Another gates (openings) 116 for housing the latch pieces 243 provided on the plug 200-2 are disposed above the gates 115. Here, the first receptacle housing 110-1 has a similar structure to that of the second receptacle housing 110-2.

As shown in FIG. 9, bosses 113-1 and 113-2 having a cylindrical shape are respectively protruded to spaces inside the first receptacle housing 110-1 and the second receptacle housing 110-2. Accordingly, a common longitudinal axes 20-20 passes through the insides of the first receptacle housing 110-1 and the second receptacle housing 110-2 which are disposed back to back. The sleeves 140 is inserted into the bosses 113-1 of the first receptacle housing 110-1 (refer to FIG. 13). Further, the sleeves 140 that protrudes from the back surface side of the bosses 113-1 are inserted into the bosses 113-2 of the second receptacle housing 110-2. The length, in the axial direction, of the sleeves 140 is approximately equal to a sum of the length of the bosses 113-1 and the length of the bosses 113-2 in the axial direction. Thus, the sleeves 140 are fixed by the bosses 113-1 and the bosses 113-2 so that the central axes of the common longitudinal axes 20-20 and the central axes of the sleeves 140 become identical.

Here, the sleeve 140 is formed to have the inner diameter which is commonly slightly smaller than the outer diameter of the ferrule 210 and have a slit in the axial direction thereof, so that the sleeve 140 can fix the ferrule 210 in the axial direction when the ferrule 210 is inserted into the sleeve 140.

The first receptacle housing 110-1 and the second receptacle housing 110-2 further include inside latching surfaces 145 (refer to FIG. 4) for locking shoulders 245 (refer to FIG. 11) of the plug 200-1 and the plug 200-2 respectively.

<Description of Connecting State>

When the plugs 200-1 and 200-2 are inserted into the receptacle 100, the optical fibers 17 which are respectively fixed to the plugs 200-1 and 200-2 are optically connected to each other (refer to FIG. 6). Further, free ends 131 (refer to FIG. 13) of the contacts 130 and the cylindrical members 220 which are respectively built in the plugs 200-1 and 200-2 are respectively brought into contact with each other and accordingly, the conductor 13 (wire) wound around one of the cylindrical members 220 and the conductor 13 wound around the other cylindrical member 220 are electrically connected to each other. For example, a distance W between a pair of free ends 131 of the contact 130 is set to be smaller than an outer diameter of the cylindrical member 220. Accordingly, when the plug 200-1 is inserted, for example, the cylindrical member 220 expands the two pieces of free ends 131 to be inserted between them, and after the insertion, the contacts 130 and the cylindrical member 220 elastically contact with each other so as to be electrically connected to each other.

The plug housing 240 includes a pair of latch pieces 243 on its upper surface and the latch pieces 243 are structured so as to be mutually locked with the inside latching surfaces 145 of the receptacle 100 (refer to FIGS. 4 and 6). The latch piece 243 includes a fixed end 244 which is disposed in a direction of the front opening part 241 of the plug housing 240 and a free end which extends in a rear direction of the plug housing 240. The pair of shoulders 245 and 245 enter from the gate 116 into the inside of the receptacle 100, then the free end of the latch pieces 243 are pressed downward so as to be engaged with the inside latching surfaces 145 (refer to FIGS. 4, 7, and 11) which is in the receptacle 100 and then returned, whereby the plugs 200-1 and 200-2 are fixed to the receptacle 100.

<Advantageous Effect>

As the structure described above, the contacts 130 and the cylindrical members 220 are respectively built in the receptacle 100 and the plugs 200-1 and 200-2, thereby being able to advantageously prevent electric shock or the like caused by exposition of parts which serve electrical connection. Further, if the ferrules 210 and the sleeves 140 are made of a ceramic member such as zirconia, abrasion accompanied by use can be prevented and accordingly processing accuracy can be maintained. Here, in the optoelectrical connector disclosed in Patent literature 1, for example, if parts serving electrical connection (the wire springs 710 of the receptacle 700 and the metallic blades 810 of the plug 800) are simply built in, a housing part becomes large. Thus, size reduction and density growth cannot be realized.

Further, the contacts 130 have shape protruding to the inside of the receptacle 100 as shown in FIG. 9, so that if a plug (having no insertion grooves 248) of the related art is inserted, the plug and the contacts 130 contact with each other, being able to prevent wrong insertion.

Further, since the optoelectrical connector of the embodiment has the identical outer shape with the related art standard (the IEC61754-20 standard), production cost can be curbed. For example, in products employing an optical cable and an optical connection mechanism of the IEC61754-20 standard, the optical cable and the optical connection mechanism can be substituted with the optoelectrical connector of the embodiment without changing other parts. Here, since the example of Patent literature 1 has a shape different from the standard, cost will be increased when parts are substituted.

[First Modification]

Figure 15:
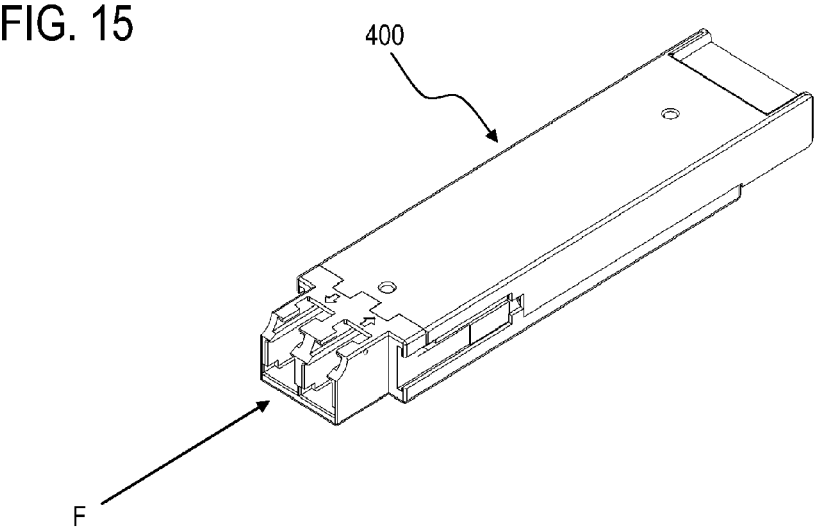
FIG. 15 is a perspective view showing the configuration of an optical module to which a plug is inserted in an optoelectrical connector according to a modification of the embodiment of the present invention.
Figure 16:
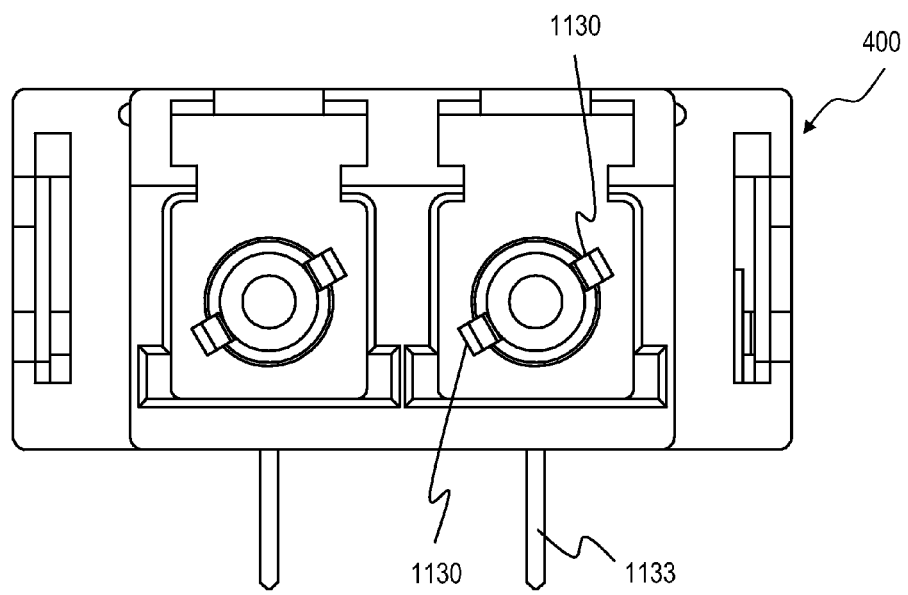
FIG. 16 is an enlarged front view of the optical module shown in FIG. 15.
Figure 17:
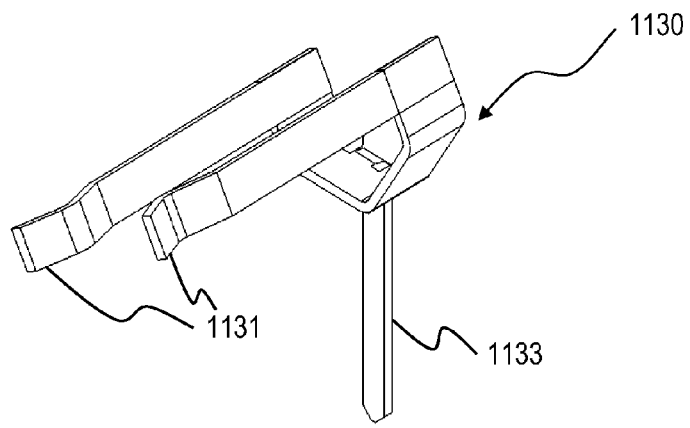
FIG. 17 is a perspective view of a contact built in the optical module shown in FIG. 15.

The photoelectric composite cables 10-1A and 10-1B are respectively connected with the photoelectric composite cables 10-2A and 10-2B by the plugs 200-1 and 200-2 and the receptacle 100 in the above embodiment. However, a photoelectric composite device (an optical module 400, for example) and the photoelectric composite cables 10-1A and 10-1B may be connected. In this case, the optical module 400 includes a part of the structure of the receptacle 100. FIG. 15 is a perspective view of the optical module 400, and FIG. 16 is a front view of the optical module 400 which is viewed from an arrow F direction of FIG. 15. FIG. 17 is a perspective view of a contact 1130 built in the optical module 400. For example, the optical module 400 includes an LED, a photo-transistor, or the like. Further, the optical module 400 has a similar structure (sleeves and contacts) to that of the receptacle 100, and performs optical connection by orienting optical axes of the optical fibers 17 of the plug 200 and optical axes of the LED and the photo-transistor. Thus, transmission/reception of optical signals is performed. The contact 1130 has a pair of free ends 1131 which contact with the cylindrical member 220 of the plug 200 and a contact pin 1133 which contacts with a pattern on a substrate on which the optical module 400 is disposed. Accordingly, the contact 1130 electrically connects the conductor 13 (wire) which is connected with the plug 200 and the pattern on the substrate.

[Second Modification]

Figure 18:
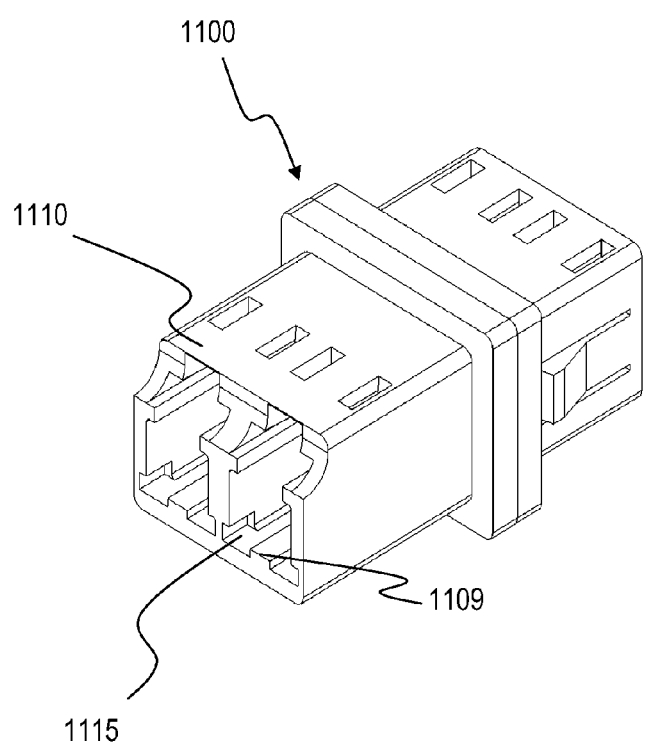
FIG. 18 is a perspective view showing a modification of a receptacle shown in FIG. 7.
Figure 19:
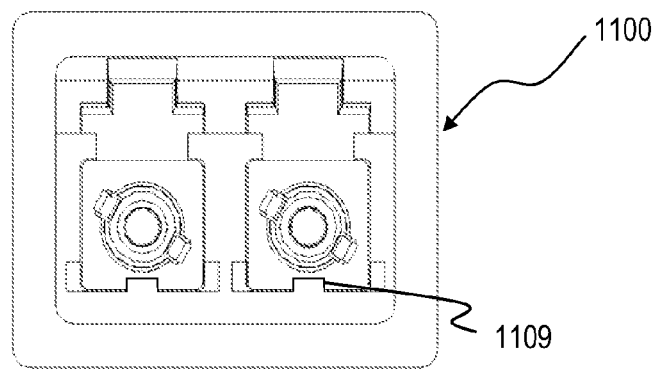
FIG. 19 is an enlarged front view of the receptacle shown in FIG. 18.
Figure 20:
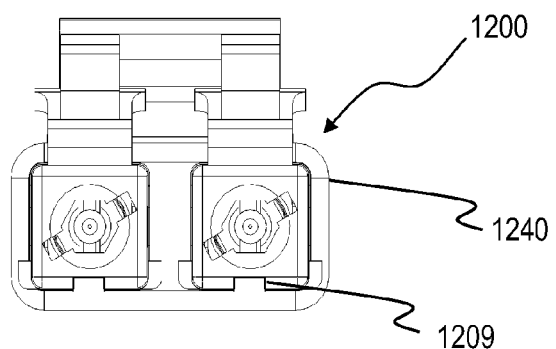
FIG. 20 is a front view of a plug which is connected to the receptacle shown in FIG. 18.

As shown in FIGS. 18 to 20, a housing 1110 of a receptacle 1100 have convex parts 1109 at gates (openings) 1115 thereof, and a housing 1240 of a plug 1200 have concave parts 1209 which corresponds to the convex parts 1109 of the receptacle 1100.

The above embodiment shows that the contacts 130 have the shape protruding to the inside of the receptacle 100 so as to contact with a plug when the plug (having no insertion grooves 248) of the related art is inserted, being able to prevent wrong insertion. However, some users may forcedly insert the plug into the inside of the receptacle 100 even though the plug and the contacts 130 contact with each other. In such case, the wrong insertion causing deformation of the contacts 130 may be performed or the plug or the receptacle 100 may be damaged. In this second modification, if a plug of the related art is inserted, the housing of the receptacle 1100 and the housing of the plug contact with each other so as to be able to prevent such wrong insertion, damage, and the like. Here, if a concave part is provided to the receptacle, a plug of the related art also can be inserted. Therefore, this advantageous effect cannot be obtained.

[Other Modifications]

The plug 200 may have insertion holes instead of the insertion grooves 248. Alternatively, the plug housing 240 may be formed to have a shape by which contact with the contacts 130 of the receptacle 100 is avoided.

Further, the number of the insertion grooves 248 provided to the plug housing 240 and the number of the contacts 130 provided to the receptacle 100 are not limited to two. For example, two insertion grooves 248' which are shown by a dashed line in FIG. 11 and two contacts 130' which are shown by a dashed line in FIG. 8 may be added and thus four insertion grooves (or four insertion holes) and four contacts may be arranged on diagonal lines (corner portions) of the quadrangle. However, the insertion grooves and the contacts do not necessarily have to be arranged on the diagonal lines (corner portions) and may be other than two or four. For example, when they are arranged on the corner portions, one to four insertion grooves (or insertion holes) and corresponding contacts (one to four) may be provided.

Further, the receptacle 100 and the plug 200 do not necessarily have to have the identical shapes to the IEC61754-20 standard. The advantageous effect of the present invention can be obtained as long as a contact composed of a conductor is built in a receptacle, a conductive cylindrical member with which an electric wire is assembled is built in a plug, and the contact and the cylindrical member contact with each other when the receptacle is inserted into the plug.

Further, the present invention is definitely applicable when one-way optical signal transmission and one-way electric signal transmission are performed. As a structure, one photoelectric composite cable is connected to a plug and the plug is connected to a receptacle.

Further, the conductor 13 of the wire only needs to be connected to the conductive cylindrical member 220 electrically and, for example, soldering may be used for connection.

Further, the optoelectrical connector does not necessarily connect the wire and the optical fiber of the photoelectric composite cable with other wire and optical fiber. The optoelectrical connector may have such structure that a through hole for letting a conductor pass therethrough is provided to the plug 200-1 to which an optical cable is connected, and the conductor is assembled with the cylindrical member through the through hole, for example.

INDUSTRIAL APPLICABILITY

The present invention is applicable to connection between photoelectric composite cables or connection between a photoelectric composite cable and a photoelectric composite device. Further, the present invention is applicable to connection between a single wire and a photoelectric composite cable or a photoelectric composite device, and between a single optical fiber and a photoelectric composite cable or a photoelectric composite device.

What is claimed is:

1. An optoelectrical connector, comprising:
   a plug to which a wire and an optical fiber are assembled; and
   a receptacle into which the plug is inserted; wherein:
   the plug includes a ferrule assembly and a plug housing which houses the ferrule assembly in a front opening thereof, the ferrule assembly being composed of an insulation ferrule that holds the optical fiber and a conductive cylindrical member that holds the insulation ferrule and to which the wire is assembled, a rear end part of the insulation ferrule is coaxially surrounded by a front end part of the conductive cylindrical member, and an assembling part of the conductive cylindrical member to which the wire is connected is formed at a position more rearward than the insulation ferrule, such that the conductive cylindrical member is entirely arranged inside the plug housing, the receptacle includes an insulation sleeve, a conductive contact, and a receptacle housing which houses the insulation sleeve and the conductive contact in an opening thereof, the conductive contact having a cantilevered shape, the insulation sleeve and the conductive contact respectively protrude toward an end of the opening of the receptacle housing such that the conductive contact extends longer than the insulation sleeve inside the receptacle housing, and when the plug is inserted into the receptacle, the conductive contact and the conductive cylindrical member contact with each other, and a front end part of the insulation ferrule that is not surrounded by the conductive cylindrical member is inserted into the insulation sleeve.

2. The optoelectrical connector according to claim 1, wherein the receptacle is provided to a photoelectric composite device.

3. The optoelectrical connector according to claims 1 or 2, wherein
external dimensions of the plug and external dimensions of the receptacle are identical to the IEC61754-20 standard,
the plug housing is provided with one of one to four insertion holes and one to four insertion grooves for receiving the conductive contact, and
the receptacle has conductive contacts corresponding to the number of one of the insertion holes or the insertion grooves.

4. The optoelectrical connector according to claim 1 or 2, wherein the receptacle housing has a convex part in the opening thereof, and the plug housing has a concave part corresponding to the convex part, in the opening thereof.

5. The optoelectrical connector according to claim 3, wherein the receptacle housing has a convex part in the opening thereof, and the plug housing has a concave part corresponding to the convex part, in the opening thereof.

* * * * *